US009570733B2

(12) United States Patent
Guen

(10) Patent No.: US 9,570,733 B2
(45) Date of Patent: Feb. 14, 2017

(54) RECHARGEABLE BATTERY

(71) Applicant: SAMSUNG SDI CO., LTD., Yongin-si, Gyeonggi-do (KR)

(72) Inventor: Min-Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/835,405

(22) Filed: Aug. 25, 2015

(65) Prior Publication Data

US 2016/0260957 A1   Sep. 8, 2016

(30) Foreign Application Priority Data

Mar. 6, 2015   (KR) .................. 10-2015-0031643

(51) Int. Cl.
| | |
|---|---|
| *H01M 2/20* | (2006.01) |
| *H01M 2/34* | (2006.01) |
| *H01M 2/26* | (2006.01) |
| *H01M 2/06* | (2006.01) |
| *H01M 2/22* | (2006.01) |
| *H01M 10/0585* | (2010.01) |

(52) U.S. Cl.
CPC .................. *H01M 2/34* (2013.01); *H01M 2/06* (2013.01); *H01M 2/22* (2013.01); *H01M 2/26* (2013.01); *H01M 10/0585* (2013.01); *H01M 2200/00* (2013.01)

(58) Field of Classification Search
CPC ............ H01M 2/34; H01M 2/22; H01M 2/06; H01M 2/26; H01M 10/0585; H01M 2200/00
See application file for complete search history.

(56) References Cited

U.S. PATENT DOCUMENTS

2002/0140401 A1   10/2002   Watanabe et al.
2009/0087730 A1    4/2009   Kondo et al.
(Continued)

FOREIGN PATENT DOCUMENTS

JP   2003-197174 A   7/2003
JP       2012-69319   4/2012
(Continued)

OTHER PUBLICATIONS

EPO Search report dated Jun. 30, 2016 for corresponding European Patent application 15188343.6, (8 pages).

*Primary Examiner* — Stewart Fraser
(74) *Attorney, Agent, or Firm* — Lewis Roca Rothgerber Christie LLP

(57) ABSTRACT

A rechargeable battery includes an electrode assembly including a first electrode tab protruded at a first end, and a second electrode tab protruded at a second end; a case having an open side and receiving the electrode assembly; a cap assembly including a cap plate covering the open side of the case, a first current collecting member coupled to a lower side of the cap plate and electrically connected to the first electrode tab, and a second current collecting member coupled to the lower side of the cap plate; and a safety member arranged on an outer surface of the electrode assembly, and the first electrode tab is protruded at the first end toward the cap plate, the second electrode tab is protruded at the second end away from the cap plate, and the second electrode tab is electrically connected to the second current collecting member through the safety member.

10 Claims, 5 Drawing Sheets

(56) References Cited

U.S. PATENT DOCUMENTS

| | | | | |
|---|---|---|---|---|
| 2013/0164574 A1* | 6/2013 | Kim | .................... | H01M 2/0207 |
| | | | | 429/61 |
| 2014/0141294 A1* | 5/2014 | Moon | .................... | H01M 2/34 |
| | | | | 429/61 |
| 2014/0141295 A1* | 5/2014 | Guen | .................... | H01M 2/347 |
| | | | | 429/61 |
| 2014/0242856 A1* | 8/2014 | Kim | ...................... | B63H 21/17 |
| | | | | 440/6 |
| 2014/0255737 A1* | 9/2014 | Moon | .................. | H01M 2/348 |
| | | | | 429/62 |
| 2015/0079431 A1* | 3/2015 | Kim | ....................... | H01M 2/34 |
| | | | | 429/61 |

FOREIGN PATENT DOCUMENTS

| | | |
|---|---|---|
| JP | 2012-204305 | 10/2012 |
| KR | 10-2007-0110566 | 11/2007 |
| WO | WO 2014/037168 A1 | 3/2014 |

* cited by examiner

RECHARGEABLE BATTERY

CROSS-REFERENCE TO RELATED APPLICATION

This application claims priority to and the benefit of Korean Patent Application No. 10-2015-0031643, filed on Mar. 6, 2015 in the Korean Intellectual Property Office, the entire content of which is incorporated herein by reference.

BACKGROUND

1. Field

Aspects of embodiments of the present invention relate to a rechargeable battery. More particularly, aspects of embodiments of the present invention relate to a reusable rechargeable battery.

2. Description of the Related Art

A rechargeable battery can be recharged and discharged, unlike a primary battery that cannot be recharged. A low-capacity rechargeable battery may be used for a small portable electronic device such as a mobile phone, a laptop computer, or a camcorder, and a large-capacity rechargeable battery may be used as a power source for driving a motor, such as for a hybrid vehicle or an electric vehicle.

The rechargeable battery generally includes, for example, an electrode assembly, a case receiving the electrode assembly, and a cap assembly closing and sealing the case. The assembly of the rechargeable battery may use a method of connecting two tabs formed at one side of the electrode assembly to a current collecting member coupled to the cap assembly.

In this process, a process of coupling the uncoated region and the current collecting member to each other is performed, and in this case, since two tabs are positioned at the same position in the electrode assembly, the coupling is difficult.

The above information disclosed in this Background section is only for enhancement of understanding of the background of the invention and therefore it may contain information that does not form the prior art that is already known in this country to a person of ordinary skill in the art.

SUMMARY

According to an aspect of one or more exemplary embodiments of the present invention, a rechargeable battery is easy to assemble.

A rechargeable battery according to one or more embodiments of the present invention includes: an electrode assembly including a first electrode tab protruded at a first end of the electrode assembly from a first electrode plate, and a second electrode tab protruded at a second end of the electrode assembly from a second electrode plate; a case having an open side and receiving the electrode assembly; a cap assembly including a cap plate covering the open side of the case, a first current collecting member coupled to a lower side of the cap plate and electrically connected to the first electrode tab, and a second current collecting member coupled to the lower side of the cap plate; and a safety member arranged on an outer surface of the electrode assembly, and the first electrode tab is protruded at the first end toward the cap plate, the second electrode tab is protruded at the second end away from the cap plate, and the second electrode tab is electrically connected to the second current collecting member through the safety member.

The safety member may include two unit safety portions arranged to be symmetrical to each other with respect to the electrode assembly. The unit safety portion may include a base portion having a size corresponding to one side of the electrode assembly; a first connection portion extended from a first edge of the base portion adjacent to the second current collecting member and including a first bent portion; and a second connection portion extended from a second edge of the base portion adjacent to the second electrode tab and including a second bent portion.

The second connection portion may be close to a lower surface of the electrode assembly. The first bent portion and the second bent portion may have an "L" shape. The second connection portion may be welded to the second electrode tab.

One of the two unit safety portions may cover a first side of the electrode assembly, and the other of the two unit safety portions may cover a second side of the electrode assembly opposite the first side.

The first electrode tab and the second electrode tab may be positioned to not be overlapping with each other along a direction (e.g., a vertical direction). The first electrode tab may protrude at the first end proximate a first side of the electrode assembly, and the second electrode tab may protrude at the second end proximate a second side of the electrode assembly.

The cap assembly may further include: a first terminal connected to the first current collecting member and protruded to an outside of the cap plate; and a second terminal connected to the second current collecting member and protruded to the outside of the cap plate.

In the rechargeable battery according to one or more exemplary embodiments of the present invention, the first electrode tab and the second electrode tab are respectively formed at different positions (e.g., on and under) of the electrode assembly. The first electrode tab is electrically connected to the first current collecting member, and the second electrode tab is electrically connected to the second current collecting member by the safety member. As described above, the first electrode tab and the second electrode tab are formed at different positions in the electrode assembly, such that the coupling process may be easily performed.

Further, the safety member is formed to enclose both sides of the electrode assembly, thereby preventing or substantially preventing swelling from being generated.

Figure 1:
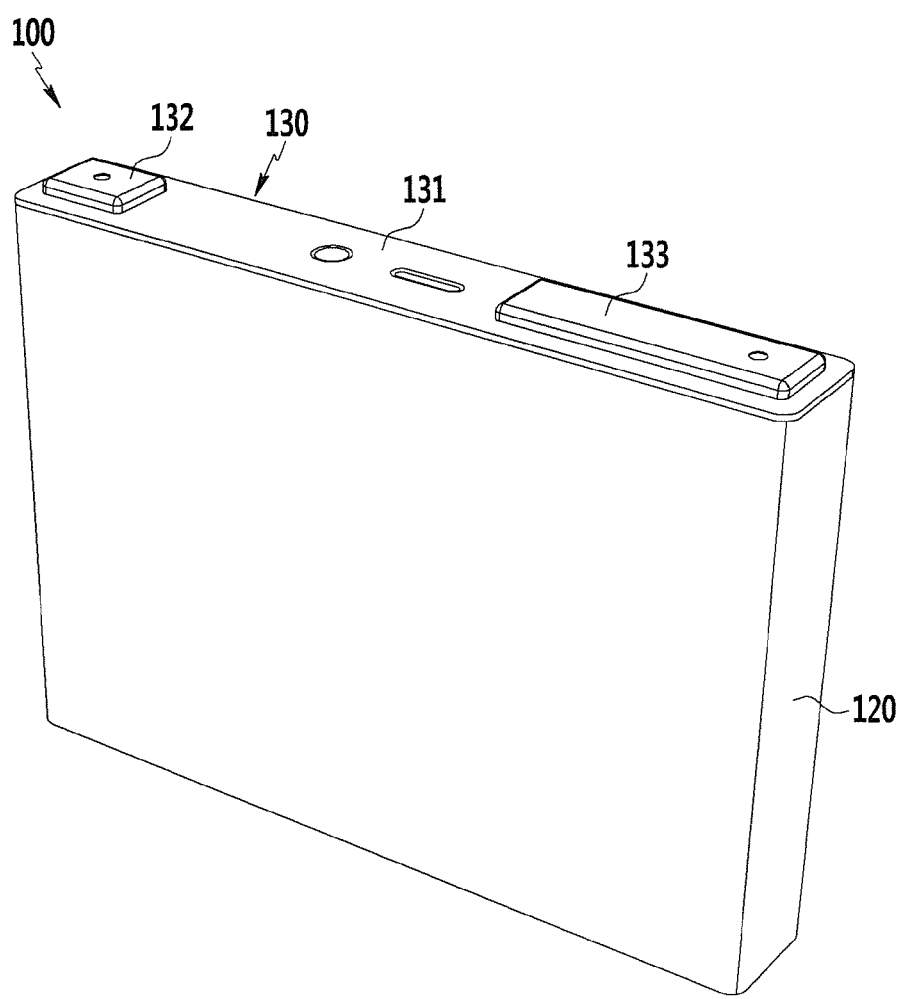
FIG. 1 is a perspective view of a rechargeable battery according to an exemplary embodiment of the present invention.

| Description of Reference Numerals Indicating Some Elements in the Drawings | |
|---|---|
| 100: rechargeable battery | 110: electrode assembly |
| 111: first electrode tab | 112: second electrode tab |
| 120: case | 130: cap assembly |
| 131: cap plate | 132: first terminal |
| 133: second terminal | 134: first current collecting member |
| 135: second current collecting member | 140: safety member |
| 141: unit safety portion | 142: base portion |
| 143: first connection portion | 144: second connection portion |

DETAILED DESCRIPTION

Aspects and features of embodiments of the present invention will be described more fully hereinafter with reference to the accompanying drawings, in which some exemplary embodiments of the present invention are shown. As those skilled in the art would realize, the described embodiments may be modified in various different ways, all without departing from the spirit or scope of the present invention. Accordingly, the drawings and description are to be regarded as illustrative in nature and not restrictive.

Like reference numerals designate like elements throughout the specification.

Further, in the following described exemplary embodiments, components having the same configuration are designated by the same reference numerals and are described with respect to the representative exemplary embodiment, and other configurations that are different from the representative exemplary embodiment are described with respect to other exemplary embodiments.

Throughout this specification and the claims that follow, when it is described that an element is "coupled" to another element, the element may be "directly coupled" to the other element or "indirectly coupled" to the other element through a third element. In addition, unless explicitly described to the contrary, the word "comprise" and variations such as "comprises" or "comprising" will be understood to imply the inclusion of stated elements, but not the exclusion of any other elements.

Figure 2:
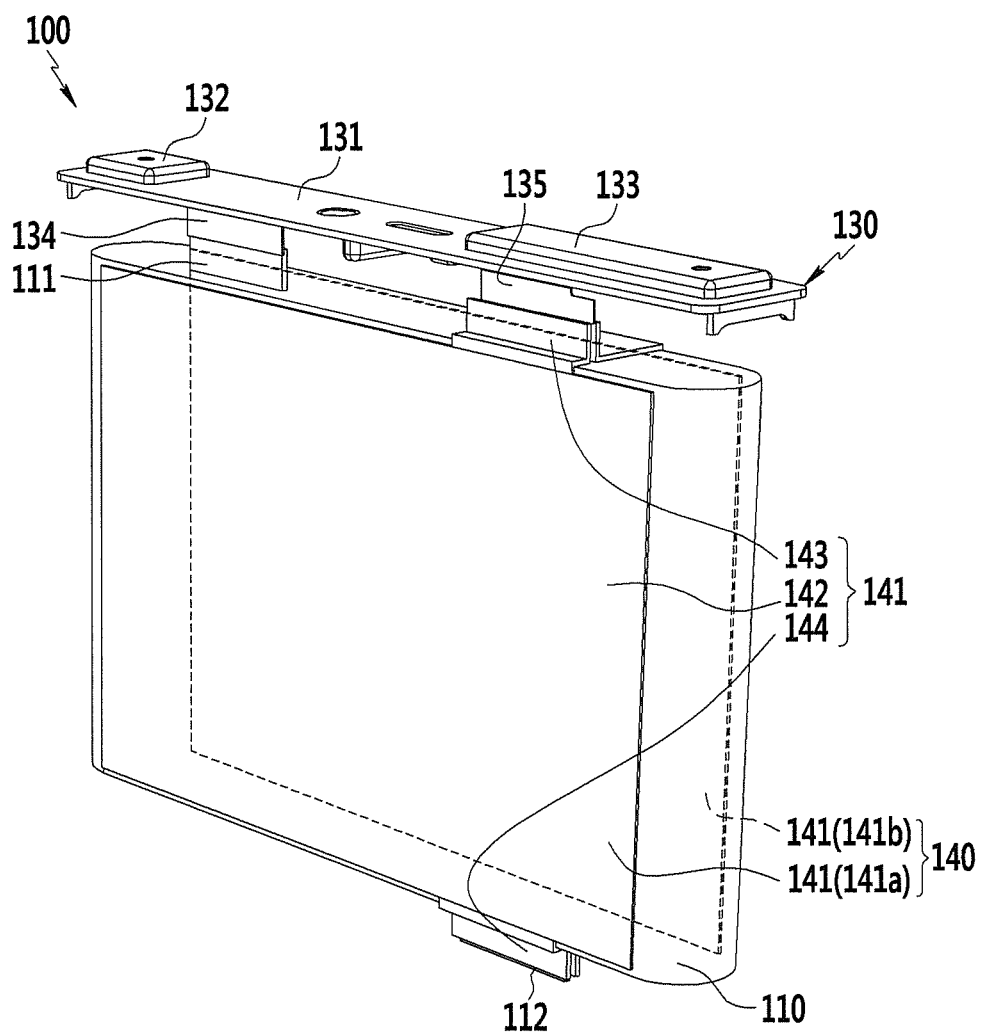
FIG. 2 is a view showing two unit safety portions of the rechargeable battery shown in FIG. 1, with a case of the rechargeable battery not shown for purposes of illustration, according to an exemplary embodiment of the present invention.

FIG. 1 is a perspective view of a rechargeable battery according to an exemplary embodiment of the present invention; and FIG. 2 is a view showing two unit safety portions in the rechargeable battery shown in FIG. 1, according to an exemplary embodiment of the present invention, with a case of the rechargeable battery not shown for purposes of illustration.

Referring to FIG. 1 and FIG. 2, a rechargeable battery 100 according to an exemplary embodiment of the present invention includes an electrode assembly 110, a case 120, a cap assembly 130, and a safety member 140.

The rechargeable battery 100 according to an exemplary embodiment is illustrated as a prismatic lithium ion rechargeable battery. However, the present invention is not restricted thereto, and is applicable to various types of batteries, such as lithium polymer batteries or cylindrical batteries.

The electrode assembly 110 may include a first electrode plate (not shown), a second electrode plate (not shown), and a separator (not shown). The separator is interposed between the first electrode plate and the second electrode plate. The first electrode plate, the second electrode plate, and the separator may be provided according to a general rechargeable battery and, as such, further detailed description thereof is omitted.

The electrode assembly 110 may include a first electrode tab 111 protruded from the first electrode plate and a second electrode tab 112 protruded from the second electrode plate.

In one embodiment, the first electrode tab 111 may be a positive electrode and the second electrode tab 112 may be a negative electrode. Alternatively, the first electrode tab 111 may be the negative electrode, and the second electrode tab 112 may be the positive electrode.

The case 120 receives the electrode assembly 110. For this, the case 120 may have an open side at one side. In further detail, the case 120 may be formed with an upper end that is open. The shape of the case 120 may be, for example, cuboid, but embodiments of the present invention are not limited thereto. The material of the case 120 may be a metal, such as, for example, aluminum or stainless steel.

The cap assembly 130 may include a cap plate 131, a first current collecting member 134, and a second current collecting member 135.

The cap plate 131 covers the open portion of the case 120. The shape of the cap plate 131 may be formed having a plate shape extending in a direction, for example, but is not limited thereto.

The first current collecting member 134 is coupled under (e.g., to a lower surface of) the cap plate 131. The first current collecting member 134 is electrically connected to the first electrode tab 111. In further detail, one side of the first current collecting member 134 is connected to the first electrode tab 111, and the other side of the first current collecting member 134 is connected to a first terminal 132 that will be described later with a non-illustrated connection terminal. That is, the first current collecting member 134 electrically connects the first terminal 132 and the first electrode tab 111.

The second current collecting member 135 is coupled under (e.g., to the lower surface of) the cap plate 131 to be oriented toward the electrode assembly 110. The first current collecting member 134 and the second current collecting member 135 may be current collecting members included in a general rechargeable battery and, as such, further detailed description thereof is omitted.

However, in the rechargeable battery 100 according to an exemplary embodiment of the present invention, the second current collecting member 135 is not directly connected to the second electrode tab 112, but is indirectly connected to the second electrode tab 112 by the safety member 140 that will be described further later. The structure thereof will be described further while describing the safety member 140.

The cap assembly 130, in one embodiment, may include the first terminal 132 and a second terminal 133.

The first terminal 132 protrudes outside the cap plate 131 and is electrically connected to the first electrode tab 111. The shape of first terminal 132 may be formed having a rectangular plate shape, for example, but is not limited thereto. As described above, the first terminal 132 may be electrically connected to the first electrode tab 111 via the first current collecting member 134 that will be described further later.

The second terminal 133 is protruded outside the cap plate 131 and is electrically connected to the second electrode tab 112. The shape of the second terminal 133 may be formed having a rectangular plate shape, for example, but is not limited thereto. As described above, the second terminal 133 is electrically connected to the second electrode tab 112 via the safety member 140 and the second current collecting member 135.

The safety member 140, in one embodiment, is formed to enclose both surfaces of the electrode assembly 110. When an object, such as a nail, from the outside penetrates the rechargeable battery 100, the safety member 140 prevents or substantially prevents a large amount of heat from being generated and an explosion caused by resistance that is sharply increased due to an internal short circuit from occurring. In the rechargeable battery 100 according to an exemplary embodiment of the present invention, the safety member 140 connects the second current collecting member 135 to the second electrode tab 112.

Further, in the rechargeable battery 100 according to an exemplary embodiment of the present invention, the first electrode tab 111 may protrude from a first end (e.g. a top side) of the electrode assembly 110 toward the cap plate 131, and the second electrode tab 112 may protrude from a second end (e.g. a bottom side) of the electrode assembly 110 toward a bottom surface of the case 120.

In further detail, the first electrode tab 111 and the second electrode tab 112 may be positioned to not overlap each other along a vertical direction. For example, the first electrode tab 111 may be positioned at a left side of the upper end of the electrode assembly 110, and the second electrode tab 112 may be positioned at a right side of the lower end of the electrode assembly 110.

Alternatively, the first electrode tab 111 may be positioned at a right side of the upper end in the electrode assembly 110, and the second electrode tab 112 may be positioned at a left side of the lower end of the electrode assembly 110.

Further, the second electrode tab 112 may be connected to the second current collecting member 135 through the safety member 140. That is, the safety member 140 may be formed to be electrically connected to the second electrode tab 112 and the second current collecting member 135.

Figure 3:
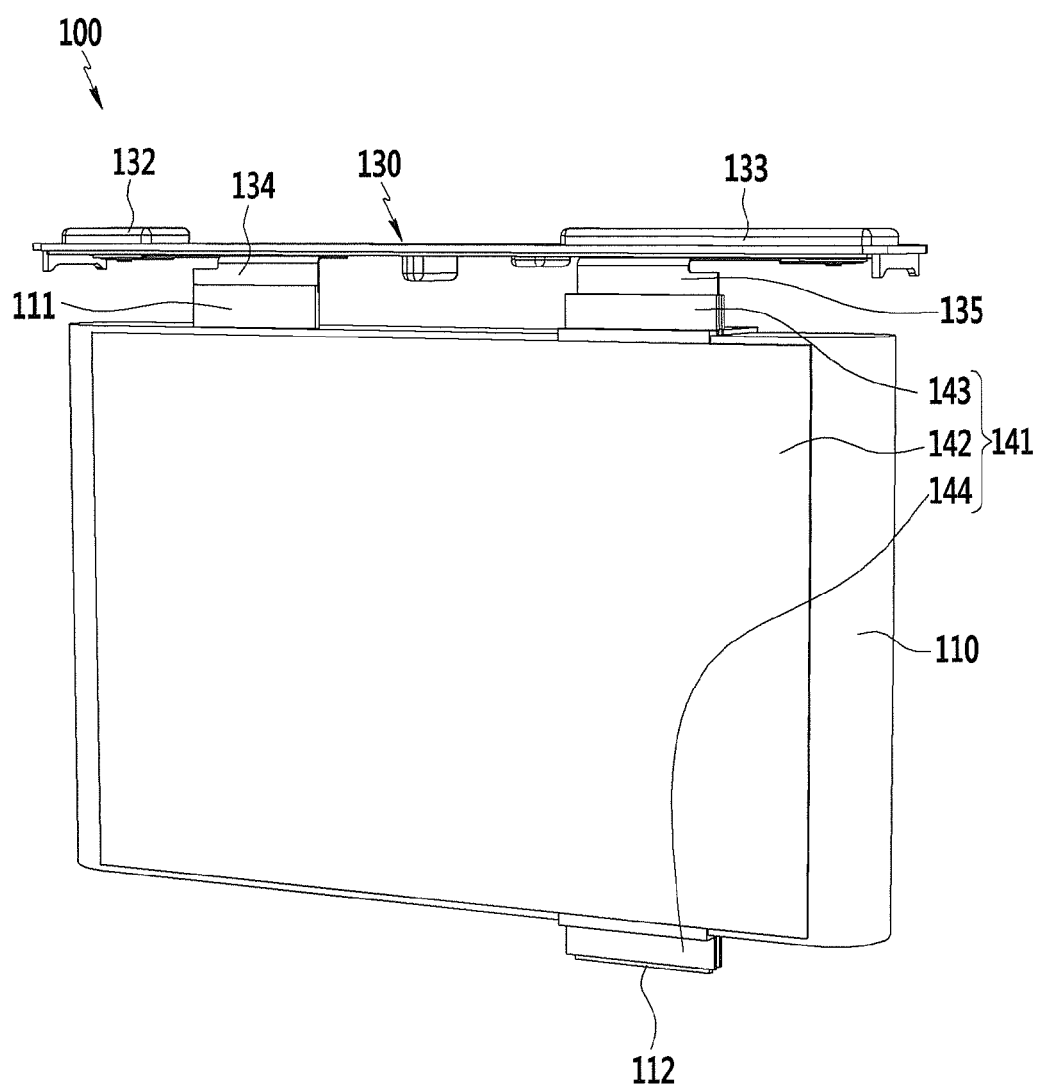
FIG. 3 is a view of the rechargeable battery shown in FIG. 1, with the case of the rechargeable battery not shown for purposes of illustration.
Figure 4:
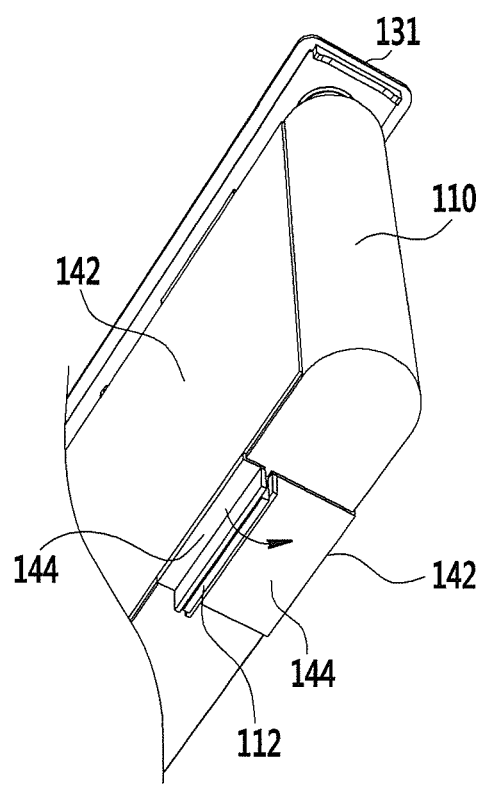
FIG. 4 is an enlarged view of a second electrode tab and a safety member in the rechargeable battery according to the exemplary embodiment of the present invention shown in FIG. 3.

FIG. 3 is a view of the rechargeable battery 100, with the case 120 not shown for purposes of illustration; and FIG. 4 is an enlarged view of the second electrode tab 112 and the safety member 140 in the rechargeable battery 100 according to an exemplary embodiment of the present invention.

Referring to FIG. 3 and FIG. 4, in one embodiment, the structure of the safety member 140 may include two unit safety portions 141, that is, a first unit safety portion 141a and a second unit safety portion 141b, having a symmetric shape with respect to the electrode assembly 110, as an example. That is, the two unit safety portions 141 may respectively be arranged close to the sides of the electrode assembly 110.

The structure of the unit safety portion 141, as an example, may include a base portion 142, a first connection portion 143, and a second connection portion 144.

The base portion 142, in one embodiment, is formed having a size corresponding to one side of the electrode assembly 110. In one embodiment, the base portion 142 may be formed having a size corresponding to the surface elongated in the lengthwise direction of the electrode assembly 110. In one embodiment, the shape of the base portion 142 may be rectangular, as an example.

The first connection portion 143 is formed to be extended from an edge of the base portion 142 near the second current collecting member 135 at the upper side of the base portion 142. In one embodiment, a portion of the first connection portion 143 is bent. For example, the first connection portion 143 may be bent from the base portion 142 at two locations (e.g., in two steps). For example, the shape of the first connection portion 143 may have a shape corresponding to that of the letter "L."

The first connection portion 143 may be connected to the second current collecting member 135. A method of connecting the first connection portion 143 and the second current collecting member 135 may include welding, as an example; however the method of connection is not limited thereto. The base portion 142 and the second current collecting member 135 may be electrically connected by the first connection portion 143.

The second connection portion 144 is formed to be extended from an edge of the base portion near or adjacent to the second electrode tab 112 (e.g., under the base portion 142) and may be partially bent. For example, the shape of the second connection portion 144 may have a shape corresponding to that of the letter "L." The second connection portion 144 may be connected to the second electrode tab 112. The method of connecting the second connection portion 144 and the second electrode tab 112 may include welding, for example; however the method of connection is not limited thereto. The base portion 142 and the second electrode tab 112 may be electrically connected by the second connection portion 144. As described above, the base portion 142 is electrically connected to the second current collecting member 135 by the first connection portion 143 such that the base portion 142 may electrically connect the second current collecting member 135 and the second electrode tab 112.

Figure 5:
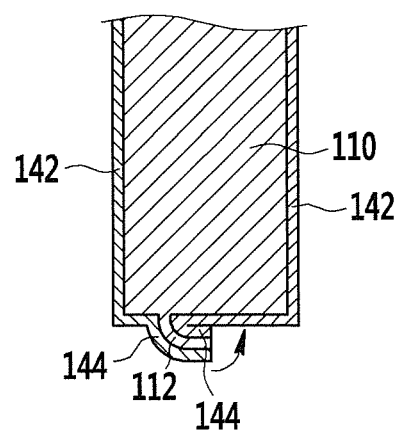
FIG. 5 is a cross-sectional view showing a second connection portion according to an exemplary variation in a rechargeable battery according to an exemplary embodiment of the present invention.

FIG. 5 is a cross-sectional view showing the second connection portion 144 according to an exemplary variation of a rechargeable battery according to an exemplary embodiment of the present invention.

Referring to FIG. 5, the second connection portion 144 according to the exemplary variation may be close to the lower surface of the electrode assembly 110, as an example. In further detail, after the second connection portion 144 is connected to the second electrode tab 112, the second connection portion 144 is bent to be close to the lower surface of the electrode assembly 110. Accordingly, a space occupied by the second connection portion 144 is minimized or reduced, thereby preventing or substantially preventing the size of the rechargeable battery 100 from being increased.

Again referring to FIG. 3, in the rechargeable battery 100 according to an exemplary embodiment of the present invention, the first electrode tab 111 and the second electrode tab 112 are respectively formed at different positions (e.g., on and under) of the electrode assembly 110. Further, the first electrode tab 111 is electrically connected to the first current collecting member 134, and the second electrode tab 112 is electrically connected to the second current collecting member 135 by the safety member 140. As described above, the first electrode tab 111 and the second electrode tab 112 are formed at different positions in the electrode assembly 110, such that the coupling process may be easily performed.

Also, in one or more embodiments of the present invention, the safety member 140 is formed to enclose both sides of the electrode assembly 110, thereby preventing or substantially preventing swelling from being generated.

The drawings and the above detailed description of some embodiments of the present invention are provided as examples of the present invention, and are used to explain the present invention but not to limit the meaning or the scope of the present invention as set forth in the claims. Accordingly, those skilled in the art should understand that various modifications and other equivalent exemplary embodiments are possible. Therefore, while the present invention has been described in connection with some exemplary embodiments, it is to be understood that the present invention is not limited to the disclosed embodiments, but, on the contrary, is intended to cover various modifications and equivalent arrangements included within the spirit and scope of the appended claims and equivalents thereof.

What is claimed is:

1. A rechargeable battery comprising:
    an electrode assembly comprising a first electrode tab protruded at a first end of the electrode assembly from a first electrode plate, and a second electrode tab protruded at a second end of the electrode assembly from a second electrode plate;
    a case having an open side and receiving the electrode assembly;
    a cap assembly comprising a cap plate covering the open side of the case, a first current collecting member coupled to a lower side of the cap plate and electrically connected to the first electrode tab, and a second current collecting member coupled to the lower side of the cap plate; and
    a safety member arranged on an outer surface of the electrode assembly,
    wherein the first electrode tab is protruded at the first end toward the cap plate, the second electrode tab is protruded at the second end away from the cap plate, and the second electrode tab is electrically connected to the second current collecting member through the safety member.

2. The rechargeable battery of claim 1, wherein the safety member comprises two unit safety portions arranged to be symmetrical to each other with respect to the electrode assembly.

3. The rechargeable battery of claim 2, wherein the unit safety portion comprises:
    a base portion having a size corresponding to one side of the electrode assembly;
    a first connection portion extended from a first edge of the base portion adjacent to the second current collecting member and including a first bent portion; and
    a second connection portion extended from a second edge of the base portion adjacent to the second electrode tab and including a second bent portion.

4. The rechargeable battery of claim 3, wherein the second connection portion is close to a lower surface of the electrode assembly.

5. The rechargeable battery of claim 3, wherein each of the first bent portion and the second bent portion has an "L" shape.

6. The rechargeable battery of claim 3, wherein the second connection portion is welded to the second electrode tab.

7. The rechargeable battery of claim 2, wherein one of the two unit safety portions covers a first side of the electrode assembly, and the other of the two unit safety portions covers a second side of the electrode assembly opposite the first side.

8. The rechargeable battery of claim 1, wherein the first electrode tab and the second electrode tab are positioned to not be overlapping with each other along a vertical direction.

9. The rechargeable battery of claim 8, wherein the first electrode tab protrudes at the first end proximate a first side of the electrode assembly, and the second electrode tab protrudes at the second end proximate a second side of the electrode assembly.

10. The rechargeable battery of claim 1, wherein the cap assembly further comprises:
    a first terminal connected to the first current collecting member and protruded to an outside of the cap plate; and
    a second terminal connected to the second current collecting member and protruded to the outside of the cap plate.

* * * * *